UNITED STATES PATENT OFFICE.

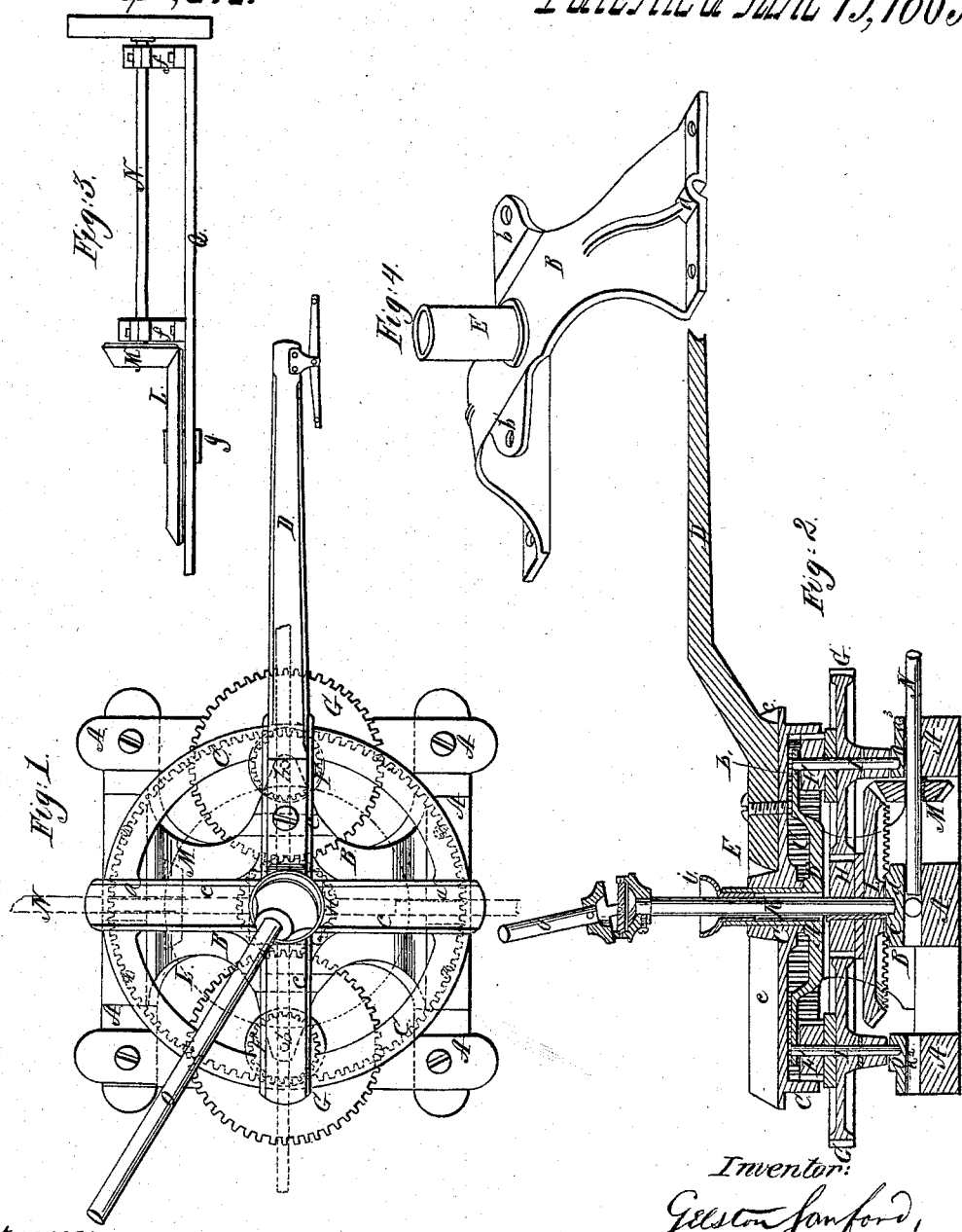

GELSTON SANFORD, OF NEW YORK, N. Y.

IMPROVEMENT IN HORSE-POWERS.

Specification forming part of Letters Patent No. 48,212, dated June 13, 1865.

*To all whom it may concern:*

Be it known that I, GELSTON SANFORD, of New York city, have invented certain new and useful Improvements in Horse-Powers; and I do hereby declare that the following is a full and exact description thereof, reference being had to the accompanying drawings, and to the letters of reference thereon marked.

To enable those skilled in the art to make and use my invention, I will describe its construction and operation.

Figure 1 is a plan view; Fig. 2, a vertical section. Fig. 3 shows the manner of arranging a portion of the gearing so as to transmit motion to the room overhead. Fig. 4 is a perspective view of the center piece of the frame.

The nature of my invention consists, principally, in the following features: First, so constructing the frame and bearings of a horse-power as to enable me to change the bearings and position of the horizontal shaft, so as to communicate power to machinery occupying different relative positions without making any change in the position of the base of the horse-power itself; also, constructing the center piece in such a manner as to admit of the hub of the driving-wheel being brought very near to the base of support; also, so constructing my machine as to allow an upright center shaft to pass through the hollow shaft, around which the driving-wheel revolves, for the purpose of transmitting motion overhead by means of a hanger-shaft; also, so arranging a bearing and support for the horizontal shaft that it can be secured either on or under the floor of the room overhead, and form a bearing for the upright shaft, the large bevel-wheel being taken from the short center shaft and put on the long hanging shaft, and made to gear into the small bevel-wheel which is to be placed in the overhead bearing; and, also, in so constructing a hanging shaft that it can be swung around the center of the short driving-shaft, so as to drive machines standing at various angles without changing the position of the frame.

In the drawings, A represents the solid square foundation-frame of the machine.

B represents the cast-iron center piece of the frame, which is to be bolted to the frame, and is provided with two bearings, $a$ $a'$, for the horizontal shaft and two bearings, $b$ $b$, for the vertical cog-wheel shafts.

C represents the internal-gear driving-wheel, which is provided with four boxes or sockets, $c$, for the reception of the operating-levers D.

E represents the hollow shaft around which driving-wheel C revolves. This short shaft E is rigidly attached to or forms part of the center piece, B, the hollow of the shaft being continued through the center piece, Fig. 2.

F F, G G, and H are multiplying cog-wheels, the wheels F and G being upon the same shafts I I, the upper bearings of which are in the boxes $b$ $b$ of the center piece, B, and the lower ends of which shafts work in socket-bearings $o$ $o$ upon the top of the bearings $a$ $a'$ of the horizontal shaft. The driving-wheel C gears into the two small cog-wheels F F, transmitting motion to the large cog-wheels G G upon the same shafts, which wheels gear into opposite sides of the small cog-wheel H, which is fastened to the vertical-central driving-shaft, K.

L represents the large bevel-wheel, also keyed to the shaft K, which works in a step or socket bearing, $d$, on the top of the quadruple bearing or journal box $e$.

M represents the small bevel-pinion on the horizontal shaft N, and receives motion from the bevel-wheel L; $i$, the oil-cup.

O represents the overhead hanging shaft, for transmitting motion to the room overhead without belting up, and consists of a shaft of suitable length provided with a universal joint, P, at the lower end, where it is attached to the vertical driving-shaft K. The object of the universal joint is to enable me to communicate to machinery in the upper story, standing at different angles with the horse-power, without moving the frame.

Fig. 3 represents another mode of transmitting power to the second story.

Q represents a plate, to which are affixed bearings $f f$, for the horizontal shaft N, and a bearing and spindle, $g$, for the large bevel-wheel L. Plate Q is to be attached either on or under the floor of the room overhead, and the bevel-wheel L is removed from its position at the foot of shaft K, and is attached to the spindle $g$, and also keyed to the upper end of the hanging shaft O, and the bevel-pinion M and its shaft N are removed from their bearings on the foundation and are placed in bearings $ff$, as shown in Fig. 3.

In operating my machine, the course of the power is as follows: From the horse or horses, through operating-levers D, to the driving-wheel C; thence to small cog-wheels F F, through them to large cog-wheels G G, and thence to the small cog-wheel H, which drives the vertical driving-shaft K; through this shaft to bevel-wheel L, to the pinion-wheel M, which drives the horizontal driving-shaft N. When I wish to drive machinery on the same plane with my horse-power, but standing at different positions, I have only to remove the horizontal shaft N from its bearings in boxes $a$ and $e$ and put it in those other bearings, $a'$ or $a^2$ or $a^3$, and the corresponding bearing in $e$.

What I claim as new, and desire to secure by Letters Patent, is—

1. The construction, combination, and arrangement of the quadruple bearing $e$ and bearings $a\ a'\ a^2\ a^3$, substantially in the manner and for the purposes herein set forth and described.

2. The center piece, B, constructed substantially as herein described.

3. The plate Q, provided with bearings $g$ and $ff$, in combination with changeable wheels L and M, in the manner and for the purposes specified.

4. The hanging shaft O and universal joint P, in combination with the driving-shaft of a horse-power, operating substantially as described.

In testimony that I claim the above I hereunto set my hand.

GELSTON SANFORD.

In presence of—
ANDREW B. HINE,
I. ROSKNECHT.